(12) United States Patent
Cui et al.

(10) Patent No.: US 10,518,414 B1
(45) Date of Patent: Dec. 31, 2019

(54) NAVIGATION METHOD, NAVIGATION SYSTEM, MOVEMENT CONTROL SYSTEM AND MOBILE ROBOT

(71) Applicants: ANKOBOT (SHENZHEN) SMART TECHNOLOGIES CO., LTD., Guangdong (CN); ANKOBOT (SHANGHAI) SMART TECHNOLOGIES CO., LTD., Shanghai (CN)

(72) Inventors: Yuwei Cui, Shanghai (CN); Chongxing Li, Shanghai (CN); Renhua Wen, Shanghai (CN); Zijing Wang, Shanghai (CN)

(73) Assignees: ANKOBOT (SHENZHEN) SMART TECHNOLOGIES CO., LTD., Shenzhen (CN); ANKOBOT (SHANGHAI) SMART TECHNOLOGIES CO., LTD., Shanghai (CN)

( * ) Notice: Subject to any disclaimer, the term of this patent is extended or adjusted under 35 U.S.C. 154(b) by 0 days.

(21) Appl. No.: 16/126,655

(22) Filed: Sep. 10, 2018

Related U.S. Application Data

(63) Continuation of application No. PCT/CN2018/090507, filed on Jun. 8, 2018.

(51) Int. Cl.
*G06F 19/00* (2018.01)
*B25J 9/16* (2006.01)
*G06K 9/00* (2006.01)

(52) U.S. Cl.
CPC .......... *B25J 9/1666* (2013.01); *B25J 9/1697* (2013.01); *G06K 9/00664* (2013.01)

(58) Field of Classification Search
CPC .... B25J 9/1666; B25J 9/1697; G06K 9/00664
(Continued)

(56) References Cited

U.S. PATENT DOCUMENTS 9,123,117 B2 * 9/2015 Ciurea ................ H04N 13/232
9,519,289 B2 * 12/2016 Munich ................ G05D 1/0246
(Continued)

FOREIGN PATENT DOCUMENTS

| CN | 103389486 | 11/2013 |
|---|---|---|
| CN | 106647742 | 5/2017 |
| CN | 107833236 | 3/2018 |

OTHER PUBLICATIONS

International Patent Application No. PCT/CN2018/090507, International Search Report and Written Opinion with English translation of Opinion, dated Feb. 27, 2019, 7 pages.

*Primary Examiner* — Ronnie M Mancho
(74) *Attorney, Agent, or Firm* — Leber IP Law; David C. Robertson

(57) ABSTRACT

The present application provides a navigation method, a navigation system, a movement control system and a mobile robot. The navigation method comprises the following steps: identifying a target object corresponding to a preset object type label from images captured by the image acquisition device; determining the relative position between the target and the mobile robot based on at least one image which contains the identified target and is captured by the image acquisition device; and generating a map marked with the object type label through marking corresponding preset object type label on a preset map based on the relative position, wherein the map is used for navigating the mobile robot. In the present application, mobile robot can move to the destination position after the destination position contained in the user instruction being identified based on the
(Continued)

object type labels on the map, so as to improve human-computer interactivity.

19 Claims, 3 Drawing Sheets

(58) Field of Classification Search
USPC .................................................. 700/245, 255
See application file for complete search history.

(56) References Cited

U.S. PATENT DOCUMENTS

| | | | |
|---|---|---|---|
| 9,519,972 B2 * | 12/2016 | Venkataraman | G06T 7/557 |
| 9,578,259 B2 * | 2/2017 | Molina | H04N 5/2258 |
| 9,751,210 B2 * | 9/2017 | Fong | B25J 9/1602 |
| 10,119,808 B2 * | 11/2018 | Venkataraman | G01B 11/22 |
| 2016/0059418 A1 * | 3/2016 | Nakamura | G01S 3/8083 |
| | | | 700/253 |

* cited by examiner

NAVIGATION METHOD, NAVIGATION SYSTEM, MOVEMENT CONTROL SYSTEM AND MOBILE ROBOT

RELATED APPLICATION

This application is a continuation application of International Patent Application No. PCT/CN2018/090507, filed Jun. 8, 2018, the entire contents of which are hereby incorporated by reference.

TECHNICAL FIELD

The present application relates to the field of intelligent robots, particularly to a navigation method, a navigation system, a movement control system and a mobile robot.

BACKGROUND

A mobile robot is a machine which can work automatically. The mobile robot can be operated under the command of human operators or in pre-programmed programs, and can act according to principles set out by the artificial intelligence technology as well. This type of mobile robot can be used indoors or outdoors, and can be used in industry or household. For example, the mobile robot can be used to replace security guards to perform patrol, or replace people to clean the ground. The mobile robot can also be used to accompany family members or assist in doing office work.

Based on visual information provided by visual sensors and in combination with movement data provided by other motion sensors, a mobile robot can create map data of the site where the robot is located, and can also provide route planning, route planning adjustment and navigation service based on the created map data, so that the efficiency of the mobile robot becomes higher. However, in practical applications, the created map only displays the position information of the object contained in the application scenario, and when users instruct a mobile robot to move to a designated position, the coordinate information of the position needs to be acquired first, therefore, the operating process is complex, and the human-computer interactivity is low.

SUMMARY

In view of the above shortcomings in the prior art, the objective of the present application is to provide a navigation method, a navigation system, a movement control system and a mobile robot, so as to improve human-computer interactivity through improving the existing map data.

In one aspect, the present application provides a processing system for a mobile robot with an image acquisition device. The processing system comprises: an input unit, configured to receive images captured by the image acquisition device; a storage unit, configured to store the captured images, preset object type labels and at least one program; and a processing unit, configured to invoke the at least one program and perform the following steps: identifying a target object corresponding to a preset object type label from images captured by the image acquisition device; determining a relative position between the target object and the mobile robot based on at least one image which contains the identified target object and is captured by the image acquisition device; and generating a map marked with the object type label through marking the corresponding preset object type label on a preset map based on the relative position, wherein the map is used for navigating the mobile robot.

In some embodiments, the step of identifying a target object corresponding to a preset object type label from images captured by the image acquisition device comprises: based on object type labels provided by a first neural network, identifying the target object corresponding to the preset object type label from the captured images.

In some embodiments, the step of determining the relative position between the target object and the mobile robot based on at least one image which contains the identified target object and is captured by the image acquisition device comprises: determining the relative position between the target object and the mobile robot based on at least one image which contains the identified target object and is captured by the image acquisition device; or determining the relative position between the target object and the mobile robot based on at least two images which contain the identified target object and are captured synchronously by different image acquisition devices.

In some embodiments, the processing unit is further configured to perform the following steps: identifying a border line between an obstacle and the ground in the captured image; and selecting an object placed on the ground from the target objects which are identified and corresponds to the preset object type labels.

In some embodiments, the step of determining the relative position between the object placed on the ground and the mobile robot based on at least one image which contains the identified target object and is captured from an image acquisition device comprises: determining the relative position between a physical position corresponding to the object placed on the ground and the mobile robot based on preset physical reference information.

In some embodiments, the step of generating a map marked with the object type label through marking corresponding object type label on a preset map based on the relative position comprises: marking corresponding object type label on a grid corresponding to the relative position on the preset map.

In some embodiments, the processing unit is further configured to perform the following steps: acquiring an instruction containing object type label; determining destination position information of the object type label contained in the instruction in the map and the current position information of the mobile robot in the map based on the generated map; and generating a navigation route from the current position information to the destination position information based on the map.

In some embodiments, the processing unit is further configured to perform a step of sending the navigation route to a terminal device, so as to display the navigation route, the current position information and/or destination position information on the map displayed by the terminal device.

In some embodiments, the step of acquiring an instruction containing object type label comprises any of: acquiring voice information, and identifying the instruction containing object type label from the voice information; or acquiring the instruction containing object type label from a terminal device, wherein the terminal device is connected with the mobile robot wirelessly.

In some embodiments, the processing system further comprises an output unit which is configured to output the current position of the mobile robot, the destination position corresponding to the object type label, the navigation route from the current position to the destination position corresponding to the object type label, and/or the movement route along which the mobile robot moves according to the navigation route so as to allow users to view.

In another aspect, the present application provides a mobile robot. The mobile robot comprises: an image acquisition device, configured to capture images during movement of the mobile robot; a movement device, configured to controllably drive the mobile robot to move; the processing system as mentioned above, connected with the image acquisition device and the movement device.

In some embodiments, the mobile robot further comprises an input device which is configured to acquire an instruction containing object type label; the processing device is further configured to perform the following steps: determining destination position information of the object type label contained in the instruction in the map and the current position information of the mobile robot in the map based on the map generated by the processing system; and controlling the movement device to move from the corresponding current position to the corresponding destination position based on the map.

In some embodiments, the input device comprises a voice input unit, the voice input unit is configured to acquire voice information; and the processing device is configured to identify instruction containing object type label from the voice information.

In some embodiments, the input device comprises a network interface unit, the network interface unit is configured to acquire the instruction containing object type label from a terminal device which is connected with the mobile robot wirelessly, and/or send the movement route from the corresponding current position to the corresponding destination position to the terminal device, so as to display the movement route, the current position information and/or destination position information on the map displayed by the terminal device.

In some embodiments, the mobile robot is a cleaning robot.

In yet another aspect, the present application provides a movement control system. The movement control system comprises: the mobile robot as mentioned above; and a terminal device, configured to communicate with the mobile robot wirelessly and acquire the map marked with object type labels of the mobile robot.

In some embodiments, the terminal device comprises: an input unit, configured to receive the instruction containing object type label; and a communication unit, configured to transmit the received instruction to the mobile robot, such that the mobile robot moves from the current position to the destination position corresponding to the object type label based on the instruction.

In some embodiments, the input unit is configured to receive a text instruction containing object type label; or the input unit is configured to receive voice information and identify the instruction containing object type label in the voice information.

In some embodiments, the terminal device further comprises a display unit, the display unit is configured to display the acquired map, and/or the display unit is configured to display at least one item selected from the following on the acquired map: the current position of the mobile robot, the destination position corresponding to the object type label, the movement route along which the mobile robot moves from the current position to the destination position corresponding to the object type label.

As mentioned above, the navigation method, the navigation system, the movement control system and the mobile robot of the present application have the following beneficial effects: through the technical solution that identifying a target object corresponding to a preset object type label, determining the relative position between the identified target object and the mobile robot based on the image captured by the image acquisition device, and generating a map marked with the object type label through marking the corresponding object type label on a preset map, the mobile robot can move to the destination position after the destination position contained in the user instruction being identified based on the object type labels on the map, so as to improve human-computer interactivity.

DETAILED DESCRIPTION

Figure 1:
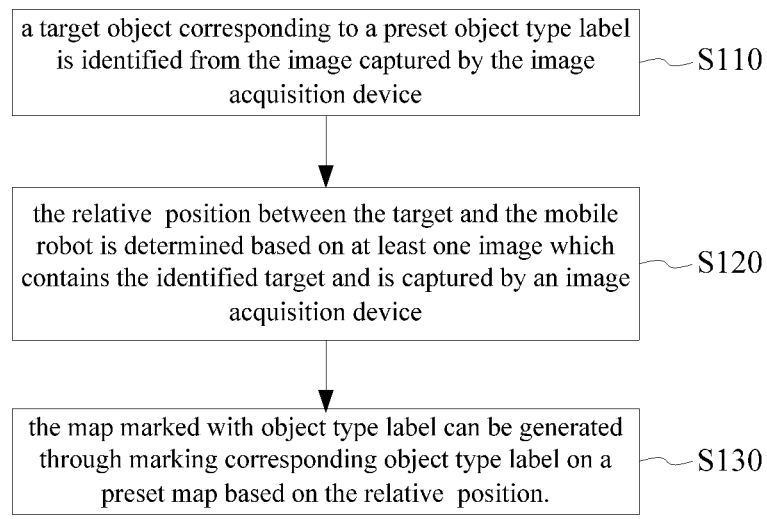
FIG. 1 shows a flow chart of a navigation method of the present application in one embodiment.

Implementations of the present application will be described below through specific embodiments, and those skilled in the art can easily understand other advantages and effects of the present application from the contents disclosed in the present specification.

Moreover, as used herein, such single forms as "one", "a" and "the" aim at also including the plural forms, unless contrarily indicted in the text. It should be further understood that, such terms as "comprise" and "include" indicate the existence of the features, steps, operations, elements, components, items, types and/or groups, but do not exclude the existence, emergence or addition of one or more other features, steps, operations, elements, components, items, types and/or groups. The terms "or" and "and/or" used herein are explained to be inclusive, or indicate any one or any combination. Therefore, "A, B or C" or "A, B and/or C" indicates "any of the following: A; B; C; A and B; A and C; B and C; A, B and C". Exceptions of the definition only exist when the combinations of elements, functions, steps or operations are mutually exclusive inherently in some ways.

Mobile robot performs movement operations based on a navigation control technology. Wherein, influenced by the scenario in which the mobile robot is applied, when the mobile robot is located at an unknown position in an unknown environment, technologies such as SLAM (Simultaneous Localization and Mapping), VSLAM (Visual Simultaneous Localization and Mapping) can be used to assist the mobile robot in creating a map and performing navigation operations. Taking the VSLAM as an example, the mobile robot can create a map based on visual information provided by the visual sensor and movement information provided by the motion sensor, and provide navigation capabilities for the mobile robot based on the created map, such that the mobile robot can move autonomously. Wherein the visual sensor for example includes an image acquisition device, and the corresponding visual information is image data (hereinafter, image). The motion sensor for example includes a speed sensor, an odometer sensor, a ranging sensor, an optical floor tracking sensor and a cliff sensor. However, in practical applications, the created map only displays the position information of the object contained in an application scenario, when user remotely control the mobile robot to send videos or images of given place, or when user remotely control the mobile robot to clean a given place, user need to identify the to-be-given position in the map stored in the mobile robot, and send control instructions to the mobile robot according to the coordinate of the corresponding position in the map, which leads to poorer human-computer interactivity.

Therefore, the present application provides a navigation method for a mobile robot. A map marked with object type labels and used for the navigation of the mobile robot can be generated by using the navigation method, such that the mobile robot can identify the destination position in the user instructions based on the object type labels on the map, and perform corresponding operations at the destination position according to user instructions. Wherein the operations include but are not limited to monitoring, cleaning or appliance control.

Herein, the mobile robot includes an image acquisition device. In some embodiments, the mobile robot includes one image acquisition device, and the mobile robot performs localization and movement control operations based on images captured by the image acquisition device. In other embodiments, the mobile robot includes at least two image acquisition devices, and the mobile robot performs localization and movement control operations based on images captured by two image acquisition devices. In addition, the mobile robot can create a map based on the navigation method provided by the present application and in combination with the SLAM technology. Or, the mobile robot can mark object type labels in the map which is created in advance, so as to generate a map marked with object type labels. Wherein the map which is created in advance includes but is not limited to: a map created based on the SLAM technology, or a map created based on site planning. The mobile robot includes but is not limited to: the robot which can move autonomously based on the map created in advance, such as a mobile robot used for accompanying family members, a cleaning robot, and a patrol mobile robot.

Please refer to FIG. 1 which shows a flow chart of a navigation method of the present application in one embodiment. Wherein the navigation method can be performed by a processing device contained in a mobile robot. In one embodiment, the processing device can preset the time interval at which an image acquisition device captures images, and then the processing device acquires static images at different time captured by the image acquisition device at the preset time interval, and performs the following steps S110 to S130. In another embodiment, the image acquisition device can capture videos, since video is composed of image frames, therefore, the processing device can firstly continuously or discontinuously collect the image frames in the acquired video, and then the processing device selects one frame of image to serve as an image and performs steps S110 to S130.

In step S110, a target object corresponding to aft preset object type label is identified from the image captured by the image acquisition device.

Wherein, the object type label is screened in advance based on the environment in which the mobile robot moves and is stored in the storage device of the mobile robot. That is, the object type label is preset. The object type label is used to describe the classification of objects which are possibly captured and placed in the environment or the image features of the objects in images.

In some examples, the object type label can be characterized by image feature of an object, and the image feature can identify target object in the image. For example, when a mobile robot is used in an indoor environment, the object type label include but is not limited to table, chair, sofa, flowerpot, shoes, sock, tiled object, cup and other image features. Wherein the tiled object include but is not limited to ground mat or floor tile map paved on the floor, and tapestry or picture hanged on the wall.

In still other examples, the object type label can be characterized by object classification. Herein, the programs stored in the storage device include network structure and connection weights of a neural network model. In some embodiments, the neural network model can be a convolutional neural network, and the network structure includes an input layer, at least one hidden layer and at least one output layer. Wherein, the input layer is used to receive the captured images or the preprocessed images; the hidden layer includes a convolutional layer and an activation function layer, and even can further include at least one of a normalization layer, a pooling layer and a fusion layer; and the output layer is used to output images marked with object type labels. The connection weights is determined according to the connection relationship of each layer in the neural network model, for example, a connection relationship between the front layer and the rear layer set based on data transmission, a connection relationship with the front layer data set based on the size of a convolution kernel in each hidden layer, and a full connection. The neural network model identifies, from the image, the classification of each object and the position of each object in the image. Still with the indoor environment as an example, the object type label include but is not limited to table, chair, sofa, flowerpot, shoes, sock, tiled object, cup and unknown objects. Wherein the tiled object include but is not limited to ground mat or floor tile map paved on the floor, and tapestry or picture hanged on the wall. In addition, the unknown object indicates that one type of object which cannot be identified by the trained neural network and can be determined to be object, the unknown objects generally include objects which exist randomly indoors, for example, debris, toys, etc.

In one embodiment, when the object type label is characterized by image feature, the captured images can be processed, analyzed and understood by using an image identification method such as an image identification based on a neural network or an image identification based on a wavelet moment, so as to identify targets with various different modes. The target can be characterized by features such as grayscale of object or contour of object. Wherein the manner of characterizing the target by the contour of the object includes obtaining the identified target through a contour line extraction method. The contour line extraction method includes but is not limited to a binary method, a grayscale method, a canny operator method. And then, for object preset with object type label and target in the image, similar image target is searched through an analysis on the corresponding relationship, similarity and consistency of the content, feature, structure, relationship, texture and grayscale of the object and image, so as to enable the target in the image to be corresponding to the preset object type label.

In another embodiment, when the object type label is characterized by object classification, the target object corresponding to the object type label can be identified from the captured images based on the object type labels provided by the first neural network. In one example, training can be performed firstly on the first neural network, for example CNN (Convolutional Neural Network), such that for the input images, the object type labels respectively representing tables, chairs, flower pots, tiled objects, cups and unknown objects and the positions of the objects in the image can be marked. After the image acquisition device captures images and outputs the captured images to the processing device, the processing device identifies the target object corresponding to the object type label from the captured images based on the object type labels provided by the first neural network. For example, the processing device can identify a table, a chair and a cup from the captured images.

Based on different application requirements of the mobile robot, the identified target can be placed on the ground or at other positions in the three-dimensional space.

In some embodiments, in order to control the mobile robot not to collide with an obstacle timely during movement, the movement route needs to be adjusted in time based on actual conditions. Therefore, when the mobile robot moves according to the movement route planned based on the map, the relative position between surrounding obstacles and the mobile robot needs to be identified according to the captured images, so as to adjust the movement route timely. In view of this, the navigation method of the present application further includes a step S111 and a step S112 (not shown in the figure).

In step S111, the border line between the obstacle and the ground in the captured image is identified.

Wherein, the obstacle can refer to object which is placed on the ground temporarily, and object which is placed on the ground and is not moved frequently (for example, a wardrobe, a bookshelf, etc) in general. Wherein the border line between an obstacle and the ground includes but is not limited to an intersecting line formed between a supporting part of the object and the ground, an intersecting line formed when an object is close to the ground. For example, the intersecting line between a leg of the table and the ground, and the intersecting line between a flowerpot and the ground. For another example, a shadow line formed between a lower edge of a short leg object and the ground. The border line is mapped in the image via capturing.

In one specific example, the processing device can determine the border line formed between the obstacle placed on the ground and the ground through identifying the position relationship between the obstacle and the ground in the image.

Herein, an object image region corresponding to an object type label is identified from the image captured by the image acquisition device, and a ground image region is determined from the image; and the intersecting line between the ground image region and the object image region is used as the border line between the obstacle and the ground, wherein, the object type label is preset.

In another specific example, the processing device uses a second neural network to identify the border line between the obstacle and the ground in the image. In practical applications, training can be performed in advance on the second neural network, such as a CNN, such that a border line between the obstacle and the ground can be identified from the input image. The input layer of such neural network can be images acquired based on the viewpoint of the robot, the size of the output layer can be the region of the possible ground in the preset image, each pixel point on the output layer is the occurrence probability of the obstacle, and numerous convolutional layers are between the input layer and the output layer. In the training process, images which are artificially marked in advance can be used, and the weight of the neural network can be adjusted by utilizing a back propagation algorithm, such that the position of the obstacle output by the network is close to the position of the obstacle which is marked artificially. After the image acquisition device captures images and output the captured image to the processing device, the processing device identifies the border line between the obstacle and the ground based on the second neural network.

In step S112, object which is placed on the ground is selected from the target objects which are identified and correspond to the preset object type labels.

Herein, according to the target objects which are identified and correspond to the preset object type label in step S110, the processing device can determine the object placed on the ground based on whether the border line identified in step S111 and target contour have an overlapped region. With the environment in which a cleaning robot is located as an example, for example, the objects identified according to the identification manner provided in step S110 include a television, an air conditioner, a chair, shoes, a ball, etc. Based on whether the identified target contour (or a frame representing the target) in the image and the identified border line have an overlapped part the chair, the shoes and the ball are determined to be placed on the ground, and then the relative position between the identified object placed on the ground and the mobile robot can be determined through performing step S120, such that the cleaning robot can avoid the object or clean the surrounding of the object enhancedly based on cleaning instructions during cleaning.

In step S120, the relative position between the target and the mobile robot is determined based on at least one image which contains the identified target and is captured by an image acquisition device. Wherein the relative position includes a physical distance and a physical deflection angle between the mobile robot and the identified target. The physical deflection angle can be described based on a preset physical space coordinate system or based on a coordinate system corresponding to a map. For example, the physical space coordinate system can be camera coordinate system or world coordinate system.

Generally, the mobile robot can include one or more image acquisition devices. During movement of the mobile robot, the image acquisition device captures images, and the mobile robot performs operations such as localization, navigation and object identification based on the captured images.

In view of this, when the mobile robot includes one image acquisition device, step S120 includes determining the relative position between the target and the mobile robot based on at least one image which contains the identified target and is captured by the image acquisition device.

In one embodiment, step S120 includes determining the relative position between the target and the mobile robot based on at least two images which contain the identified target and are captured from an image acquisition device.

Wherein the two images can be an image at the current time and an image at the previous time acquired by the image acquisition device. That is to say, step S120 includes acquiring positions of matching features of the identified target in the image at the current time and in the image at the previous time based on an image at the current time and an image at the previous time containing the identified target and captured by one image acquisition device, and determining the relative position between the target and the mobile robot according to the positions and the corresponding relationship between an image coordinate system and a physical space coordinate system. For the implementations of the above steps, the localization method of the robot described in the U.S. patent application Ser. No. 16/043,746 can herein incorporated by reference, in which the relative position between the robot and the target can be determined based on the positions of matching features of the target in the image at the current time and in the image at the previous time and based on the corresponding relationship between the image coordinate system and the physical space coordinate system.

For the above step S112 that the object which is placed on the ground is selected from the target objects which are identified and correspond to the preset object type labels, step S120 includes determining the relative position between the physical position corresponding to the object placed on the ground and the mobile robot based on preset physical reference information.

Wherein the physical reference information includes but is not limited to a physical height between the image acquisition device and the ground, physical parameters of the image acquisition device, and the angle between the optic axis of the image acquisition device and the horizontal or vertical plane. Herein, those skilled in the art measure the distance between an imaging center of the image acquisition device and the ground in advance, and consider the distance as the physical height or as an initial value of the physical height and store it in the storage device. The physical height can also be obtained through a calculation of the design parameters of the mobile robot in advance. The angle or an initial value of the angle between the optic axis of the image acquisition device and the horizontal or vertical plane can be obtained according to the design parameters of the mobile robot. For a mobile robot with an adjustable image acquisition device, the stored angle can be determined by adding/subtracting an adjusted deflection angle on the initial value of the angle, and the stored physical height is determined by adding/subtracting an adjusted height on the initial value of the physical height. The physical parameters of the image acquisition device include an angle of view of lens, a focal length of lens, and so on.

Herein, after the processing device determines the border line between the obstacle and the ground from the acquired images, based on the imaging principle calculation and the physical reference information, the processing device determines the distance between the object placed on the ground and captured in the image and the mobile robot, and determines the orientation angle between corresponding object and the mobile robot.

Figure 2:
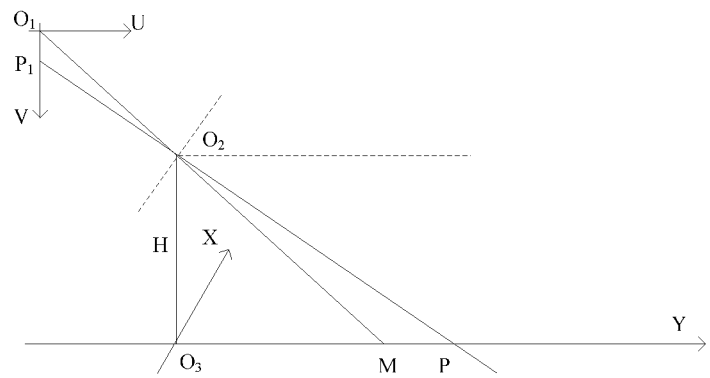
FIG. 2 shows a principle schematic diagram of determining the relative position between an object and a mobile robot based on an imaging principle.

Please refer to FIG. 2 which shows a principle schematic diagram of determining the relative position between an object and a mobile robot based on an imaging principle. As shown in the figure, there are three coordinate systems in the figure, namely, an image coordinate system $UO_1V$, a world coordinate system $XO_3Y$, and a camera coordinate system with $O_2$ as the origin. Suppose the position where the object is placed on the ground contains point P, and the length of $O_3P$ can be calculated based on the known physical height H between the image acquisition device and the ground, the distance $O_3M$ on the Y axis between the world coordinate point corresponding to the image coordinate center and the image acquisition device, the image coordinate $O_1$ of the central point of the lens, the image coordinate $P_1$ of the measuring pixel point, the length and width of the actual pixel, and the focal length of the image acquisition device. Therefore, the physical distance between the mobile robot and the point P of the object can be obtained according to the length of $O_3P$.

In order to determine the orientation angle between the point P of the object and the mobile robots, the processing device can calculate the orientation angle between the mobile robot and the point P of the object at the current time according to the corresponding relationship between each pixel point in the image which is stored in the storage device in advance and the actual physical orientation angle. Wherein each pixel point corresponds to an orientation angle, and the orientation angle can be calculated based on parameters such as quantity of pixels, a focal length and an angle of view of an image acquisition device.

Based on the above manner, the processing device determines a first relative position between the physical position corresponding to at least one pixel point on the border line and the mobile robot based on the preset physical reference information and the pixel position of each pixel point on the border line in the image, wherein the first relative position includes a physical distance and an orientation angle. Wherein the processing device can perform traversal operation on each pixel point or feature point of the border line according to the above manner, so as to determine the relative positions of multiple position points of the identified border line, namely, the physical distances and the orientation angles. Wherein the feature point includes but is not limited to an angular point, an end point, an inflection point of the border line. For example, based on the angular point and the inflection point of the border line, the processing device determines the relative position between each object local position corresponding to each feature point on the border line and the mobile robot respectively. The processing device can only determine the closest relative position between the identified object and the mobile robot according to the above manner. For example, the processing device determines the closest relative position between the identified object and the mobile robot through the image position of the border line in the image, so as to adjust the navigation route timely.

In other examples, the mobile robot includes at least two image acquisition devices, and step S120 includes determining the relative position between the target and the mobile robot based on at least two images which contain the identified target and are captured synchronously from different image acquisition devices.

In a specific example, the position of matching feature of the identified target in each of the images at the current time are acquired based on the images at the current time which contain the identified target and are captured respectively by two image acquisition devices, and the relative position between the target and the mobile robot is determined according to the acquired positions and the position relationship between the image acquisition devices.

Figure 3:
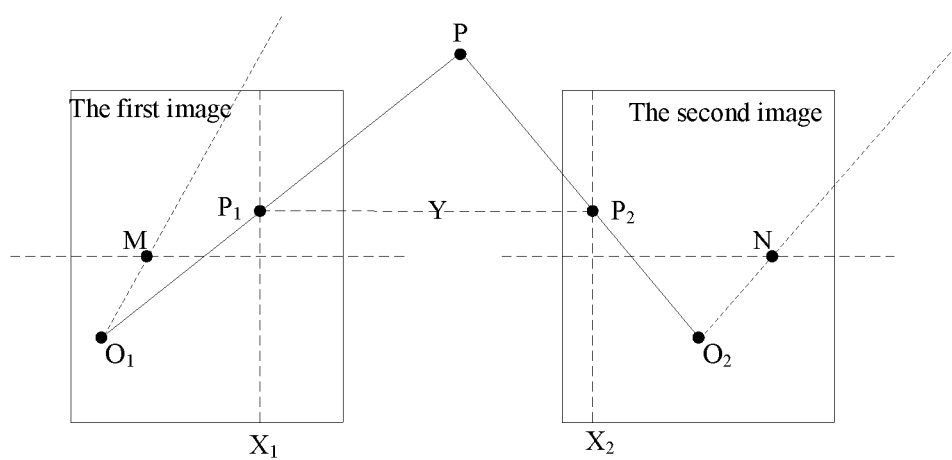
FIG. 3 shows a principle schematic diagram of determining the relative position between an object and a robot based on a binocular ranging principle.

Please refer to FIG. 3 which shows a principle schematic diagram of determining the relative position between the object and the robot based on a binocular ranging principle. As shown in the figure, there are the first image and the second image in the figure, wherein the first image is an image captured by the first image acquisition device of the robot, while the second image is an image captured by the second image acquisition device of the robot. $O_1M$ is an optic axis of the first image acquisition device, while $O_2N$ is an optic axis of the second image acquisition device. P represents a point on the object in the space, $P_1$ is an image of point P in the first image device, while $P_2$ is an image of point P in the second image device. Suppose that internal parameters and external parameters of the first image acquisition device and the second acquisition device are completely the same, the focal length is f, the distance (a base line $O_1O_2$) between optic centers is B, then the distance of point P in a three-dimensional space can be obtained through calculation, namely, the distance is the physical distance between the mobile robot and the point P of the object.

In order to determine the orientation angle between point P of the object and the mobile robots, the processing device can calculate the orientation angle between the mobile robot and the point P of the object at the current time according to the corresponding relationship between each pixel point in the image which is stored in the storage device in advance and the actual physical orientation angle. Wherein each pixel point corresponds to an orientation angle, and the orientation angle can be calculated based on parameters such as quantity of pixels, a focal length and an angle of view of an image acquisition device.

The processing device can perform traversal operation on each pixel point or feature point of the identified target according to the above manner, so as to determine the relative positions of multiple position points of the identified target, namely, the physical distances and the orientation angles. Wherein the feature point includes but is not limited to an angular point, an end point, an inflection point of the target. For example, based on the angular point and the inflection point of the target, the processing device determines the relative position between each object local position corresponding to each feature point on the target and the mobile robot respectively. The processing device can only determine the closest relative position between the identified object and the mobile robot according to the above manner For example, the processing device determines the closest relative position between the identified object and the mobile robot through the image position of the target in the image, so as to adjust the navigation route timely.

The processing device can determine the relative positions between one or more obstacles captured in the images and the mobile robot according to the above manner.

It should be noted that, for multiple identified targets, the processing device determines the relative position between each target and the mobile robot respectively based on the above one or more manners. For example, the processing device calculates the relative positions between all the identified targets and the mobile robot by utilizing a binocular image acquisition device. For another example, the processing device calculates the relative position between the identified target placed on the ground and the mobile robot by utilizing a monocular ranging method, and calculates the relative position between the identified target which is not placed on the ground and the mobile robot through capturing multiple images. Endless examples will not be recited herein. Each identified target and its relative position are used for performing step S130.

In step S130, the map marked with object type label can be generated through marking corresponding object type label on a s based on the relative position. The map is used for navigating the mobile robot.

With the preset map being a map created in advance based on site planning as an example, the map is created based on unit vectors and is scaled down based on the physical size of the actual site. Based on the target identified from images and corresponding to the preset object type label, the relative position between the determined target and the mobile robot, and the length and direction of unit vector, the processing device marks the object type label corresponding to the identified target at corresponding position on the map, and updates the map.

With the preset map which is a map created based on grids as an example, the map is created based on unit grid, the processing device marks the object type label corresponding to the identified target on the grid corresponding to the relative position in the preset map according to the target which is identified from images and corresponds to the preset object type label, the determined relative position between the target and the mobile robot, and the length and direction of the unit grid, and updates the map.

The updated map can be displayed to users by the processing device at an appropriate time. For example, each object type label can be displayed on the map based on the operation of viewing the map by user.

When the map which is marked with object type labels is generated, the navigation method of the present application can further generate a navigation route from the current position to a destination position based on the generated map marked with object type labels and based on the acquired instruction containing object type label. That is to say, the mobile robot generates a navigation route from the current position of the mobile robot to a destination position indicated by the object type label based on instruction sent out by users and the map marked with object type labels obtained based on any of the above examples. Wherein the instruction include object type label. For example, users input an instruction which indicates that the destination position is a flowerpot, then the mobile robot finds out a position marked with the label of flowerpot on the map based on the indication indicated by the instruction, and generates a navigation route from the current position of the mobile robot to the flowerpot.

In addition, when a navigation route is generated, the navigation method of the present application further includes a step of controlling the mobile robot to move from the corresponding current position to the corresponding destination position based on the navigation route. For example, users input an instruction which shows that the destination position is a flowerpot, then the mobile robot finds out a position marked with the label of flowerpot on the map based on the indication indicated by the instruction, and moves to the flowerpot according to the map. It should be noted that, the instruction can contain one or more object type labels, and the mobile robot can move to corresponding destination position indicated by each object type label in sequence.

Figure 4:
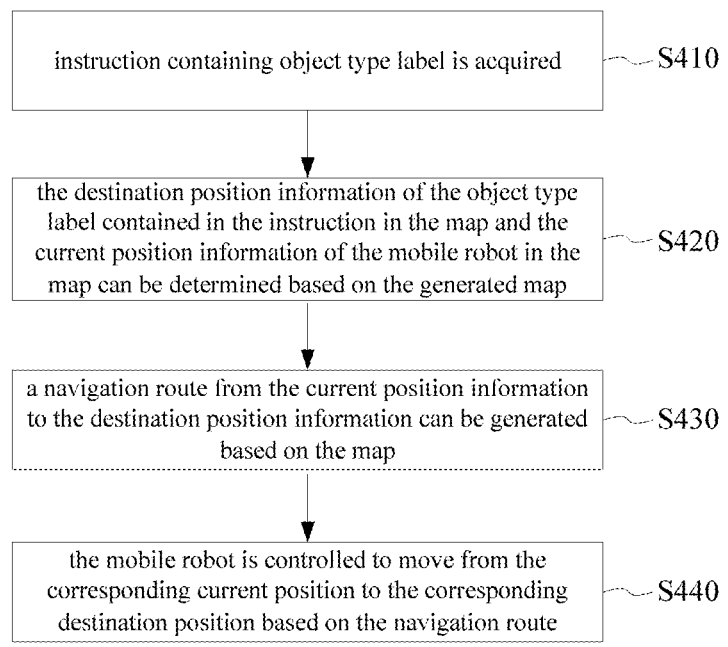
FIG. 4 shows a flow chart of a navigation method of the present application in another embodiment.

Please refer to FIG. 4 which shows a flow chart of a navigation method of the present application in another embodiment. As shown in the figure, the navigation method includes steps S410-S440.

In step S410, instruction containing object type label is acquired.

Wherein the manner of acquiring instruction containing object type label includes but is not limited to a voice manner or a text manner. Herein, based on the operating purposes of users on the mobile robot, the instruction can also include executing instruction of the mobile robot. For example, the instruction can further include cleaning instruction, patrol instruction, remote control instruction, and so on.

In one embodiment, step S410 can include: acquiring voice information, and identifying the instruction containing object type label from the voice information. In one example, the mobile robot can directly receive the voice information of users and identify the instructions of the object type labels contained in the information. For example, users can directly say "flowerpot" to the mobile robot, and after receiving the instruction, the mobile robot moves to the flowerpot to perform corresponding processing which is set in advance. With a cleaning robot as an example, when presetting that the cleaning robot moves to the position corresponding to the object type label to perform cleaning operation after receiving the instructions containing object type label, and when users say "flowerpot" to the cleaning robot, the cleaning robot moves to the flowerpot to perform cleaning operation after receiving the voice instruction. In addition, the voice information is not limited to short instruction which only represent object type label, and can also be long instruction containing object type label, for example, when users say "go to the flowerpot", then the mobile robot can identify the instruction of object type label "flowerpot" contained in the voice information, and then perform the following operations.

In another embodiment, step S410 includes: acquiring instruction containing object type label from a terminal device, wherein the terminal device is connected with the mobile robot wirelessly. In one example, uses input instruction containing object type label in the form of a text via the terminal device. For example, users input "flowerpot" in the form of a text via an APP on the mobile phone. In another example, uses input instruction containing object type label in the form of voice via the terminal device. For example, users input "flowerpot" in the form of voice via an APP on the mobile phone. In addition, the voice information input by users is not limited to short instruction which only represent object type label, and can also be long instruction containing object type label, for example, when users say "go to the flowerpot", the terminal device translates the voice information into a text and extracts keywords such as flowerpot, and matches the translated text with corresponding instruction to send to the mobile robot. Herein, the terminal device can be connected with the mobile robot in a wireless manner or bluetooth pairing manner, so as to send the instruction received by the terminal device to the mobile robot for subsequent operations.

In step S420, the destination position information of the object type label contained in the instruction in the map and the current position information of the mobile robot in the map can be determined based on the generated map. Wherein the map is generated by the above navigation method.

Herein, the position of object type label contained in the instruction in the map are acquired according to the corresponding object type label marked on the map, and the acquired position is considered as destination position information. Meanwhile, based on movement data in a physical space of the mobile robot which can be provided by the image acquisition device or motion sensor such as an odometer sensor of the mobile robot, the current position information of the mobile robot in the map is obtained with mapping.

In step S430, a navigation route from the current position information to the destination position information can be generated based on the map.

In some embodiments, the mobile robot generates a navigation route from the current position information to the destination position information according to the current position of the mobile robot, the destination position of the object type label on the map and the position information of other objects on the map or preset routes. For example, the navigation route can be the shortest route from the current position of the mobile robot to the destination position. For another example, the navigation route can be a route which is from the current position of the mobile robot to the destination position and is not overlapped with the previous travelling route of the mobile robot. With the mobile robot being a cleaning robot as an example, based on the region which is not cleaned and the region which has been cleaned, a navigation route which is from the current position to the destination position and along which the cleaned region will not be cleaned repeatedly can be set, thereby improving cleaning efficiency.

In step S440, the mobile robot is controlled to move from the corresponding current position to the corresponding destination position based on the navigation route.

In some embodiments, the mobile robot can be controlled to move from the corresponding current position to the corresponding destination position based on the destination position indicated by the object type label on the map marked with object type labels, and the current position of the mobile robot in the map acquired by the motion sensor, and other information on the map such as the position information of the other objects or preset routes. For example, the mobile robot can be controlled to move from the current position to the destination position according to a movable route marked on the map.

In addition, in some embodiments, the mobile robot can send the movement route from the corresponding current position to the corresponding destination position to a mobile terminal, so as to display the movement route, the current position information, the destination position information or any arbitrary combination thereof on the map displayed by the terminal device, and facilitate users to view. For example, in some conditions, the current position of the robot can be displayed in real time on the map displayed by the terminal device, and when the destination position is the position where the flowerpot is located, the flowerpot is displayed at the destination position on the map, and the movement route from the current position of the mobile robot to the flowerpot is displayed on the map.

In the navigation method of the present application, through the technical solution that identifying a target object corresponding to the preset object type label, determining the relative position between the identified target and the mobile robot based on the image captured by the image acquisition device, and generating a map marked with the object type label through marking corresponding object type label on a preset map, the mobile robot can move to the destination position after the destination position contained in the user instruction being identified based on the object type labels on the map, so as to improve human-computer interactivity.

In other embodiments, in consideration that the object type labels cannot cover all types of objects, for example, when objects in the images are classified into limited number of object classifications by using the first neural network, unknown objects can be identified based on the first neural network. The navigation method further includes a step of optimizing and updating the first neural network. In one example, sample information can be generated based on images which contain unknown objects and are captured by the image acquisition device, and the sample information can be sent to a server, so that the server can optimize the first neural network.

In this condition, the processing device uses images which contain unknown objects and are captured by the image acquisition device as sample information and sends the sample information to a server, and the server can provide an interface which can be artificially marked by a human-labeler, such that the server can train the first neural network model through the manner of artificial marking, so as to improve the capability of the first neural network in identifying objects. The parameters of the trained first neural network are packaged in an updated version and are fed back to the mobile robot. The processing device can update each parameter in the first neural network through a manner of version updating, thereby obtaining the optimized first neural network.

In one example, for the sample information sent by each mobile robot, the server can optimize the first neural network preset in the robot to upgrade the robot. In another example, after receiving the sample information sent by multiple mobile robots, the server can compare and screen the sample information data and perform unified optimization on the first neural network preset in all the mobile robots of the current version, so as to perform unified upgrading on the mobile robots of the current version.

After the first neural network is optimized by the server, the processing device of the mobile robot updates the preset first neural network based on the feedback information of the server, so as to use the updated first neural network to identify the above unknown objects in the images which are captured subsequently.

Similarly, for the condition in which the second neural network is used to identify the border line, the navigation method further includes a step of optimizing and updating the second neural network. In one example, the sample information can be generated based on the captured images. Wherein the sample information includes images used for training and border line information used to describe the accurate position of the border line.

Wherein, the image used for training includes a border line which is not identified or an obstacle which is not identified and is placed on the ground. In order to describe the identified obstacle and the obstacle which is not identified clearly, the identified obstacle is referred to as a first obstacle below, while the obstacle which is not identified is referred to as a second obstacle. Wherein the second obstacle includes the obstacle whose border line with the ground is not identified in the captured images; and the second obstacle further includes the obstacle which is newly added and is not captured in the image. Herein, the image used for training can be the image which is originally captured, or the image used for training can be a processed image, so as to prevent leakage of user information. For example, the processed image can be an image obtained after the original image is subjected to mosaic treatment or after the original image is subjected to a contour extracting, as long as the image used for training can include the feature of the border line between the second obstacle and the ground.

Wherein the border line information includes the second relative position between the second obstacle placed on the ground and the mobile robot, and/or the pixel position of the second obstacle placed on the ground in the image used for training. In some specific examples, the border line information between the second obstacle and the ground can be acquired based on a sensing device in the mobile robot, and the sensing device can include a laser ranging sensor, an infrared sensor and a collision sensor. For example, during movement of the mobile robot, the second relative position between the second obstacle and the mobile robot is acquired through a laser ranging sensor. For another example, during movement of the mobile robot, when the robot collided with the second obstacle, the position information of the second obstacle can be obtained by collision sensor of the mobile robot, and then, the processing device of the mobile robot controls the mobile robot to return back to the position where the image acquisition device captures images at the previous time, and acquires the second relative position between the collided second obstacle and the mobile robot based on the movement distance provided by the processing device, or acquires the second relative position between the collided second obstacle and the mobile robot based on the laser ranging sensor of the mobile robot. In still other specific examples, the pixel position of the second obstacle in the image can be derived based on the relative position of the mobile robot in the physical space when images are captured and the second relative position of the second obstacle detected by the sensor.

The processing device of the mobile robot sends the obtained sample information to a server. The server optimizes the second neural network after receiving the sample information. Wherein the server can train the second neural network model by using the image in the sample information as an input of the second neural network and the pixel position corresponding to border line information described in the image as an output of the second neural network, and obtain the updated second neural network parameters, so as to improve the accuracy of the second neural network in identifying the border line.

The parameters of the trained second neural network model are packaged in an updated version and fed back to the mobile robot, and each parameter in the second neural network is updated by the processing device through a manner of version updating, thereby obtaining the optimized second neural network. In one example, for the sample information sent by each mobile robot, the server can optimize the second neural network preset in the robot to upgrade the robot. In another example, after receiving the sample information sent by multiple mobile robots, the server can compare and screen the sample information data and perform unified optimization on the second neural network preset in all the mobile robots of the current version, so as to perform unified upgrading on the mobile robots of the current version, thereby identifying the border line between the second obstacle and the ground from images which contain the corresponding second obstacle and are captured subsequently by utilizing the updated second neural network.

In the present application, through the technical solution in which the sample information is sent to a server and the neural network model is optimized at the server, and the neural network preset in the mobile robot is updated based on the optimized neural network, the accuracy of the map of the mobile robot can be improved.

Figure 5:
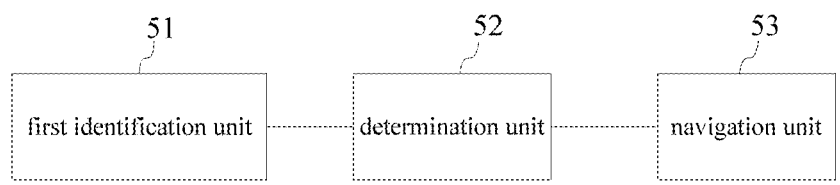
FIG. 5 shows a structural schematic diagram of a navigation system of the present application in one embodiment.

The present application further provides a navigation system used for a mobile robot. The mobile robot includes an image acquisition device. Please refer to FIG. 5 which shows a structural schematic diagram of a navigation system of a mobile robot of the present application in one embodiment. As shown in the figure, the navigation system includes a first identification unit 51, a determination unit 52 and a navigation unit 53.

Wherein the first identification unit 51 is configured to identify a target object corresponding to the preset object type label from images captured by the image acquisition device.

In some embodiments, the first identification unit 51 is configured to identify the target object corresponding to the object type label from the captured images based on object type labels provided by a first neural network.

The determination unit 52 is configured to determine the relative position between the target and the mobile robot based on at least one image which contains the identified target and is captured by the image acquisition device.

In some embodiments, the determination unit 52 includes a first determination unit and a second determination unit. The first determination unit is configured to determine the relative position between the target and the mobile robot based on at least one image which contains the identified target and is captured by the image acquisition device. The second determination unit is configured to determine the relative position between the target and the mobile robot based on at least two images which contain the identified target and are captured synchronously by different image acquisition devices. In some embodiments, the first determination unit is configured to acquire positions of matching features of the identified target in the image at the current time and in the image at the previous time based on an image at the current time and an image at the previous time which contain the identified target and are captured by one image acquisition device, and determine the relative position between the target and the mobile robot according to the acquired positions and the corresponding relationship between an image coordinate system and a physical space coordinate system. In some embodiments, the second determination unit is configured to acquire positions of matching features of the identified targets in the image at the current time based on images at the current time which contain the identified target and are captured respectively by two image acquisition devices, and determine the relative position between the target and the mobile robot according to the acquired positions and the position relationship between the image acquisition devices.

The navigation unit 53 is configured to generate a map marked with the object type label through marking corresponding object type label on a preset map based on the relative position, and the map is used for navigating the mobile robot. In some embodiments, the navigation unit 53 is configured to mark corresponding object type label on a grid corresponding to the relative position on the preset map.

In practical applications, in order to control the mobile robot not to collide with an obstacle during movement timely, the movement route need to be adjusted in time based on actual conditions. Therefore, when the mobile robot moves according to the movement route planned based on the map, the relative position between surrounding obstacles and the mobile robot needs to be identified according to the captured images, so as to adjust the movement route timely. In view of this, the navigation system further includes a second identification unit, and the second identification unit is configured to identify a border line between the obstacle and the ground in the captured image, and select objects placed on the ground from the targets which are identified and correspond to the preset object type labels. In some embodiments, the second identification unit can identify the border line between the obstacle and the ground in the image by using the second neural network. In this condition, the determination unit 52 is configured to determine the relative position between the physical position corresponding to the object placed on the ground and the mobile robot based on the preset physical reference information. Wherein the physical reference information includes: a physical height between the image acquisition device and the ground, physical parameters of the image acquisition device, and the angle between the optic axis of the image acquisition device and the horizontal or vertical plane.

In addition, when a map marked with object type labels is generated, the navigation system of the present application further includes an acquisition unit which is configured to acquire an instruction containing object type label. In some embodiments, the acquisition unit is configured to acquire voice information, and identify the instruction containing object type label from the voice information. In other embodiments, the acquisition unit is configured to acquire an instruction containing object type label from a terminal device, wherein the terminal device is connected with the mobile robot wirelessly.

Correspondingly, the determination unit 52 is further configured to determine the destination position information of the object type label contained in the instruction in the map and the current position information of the mobile robot in the map based on the generated map; and the navigation unit 53 is further configured to generate a navigation route from the current position information to the destination position information based on the map. In addition, the navigation unit is further configured to control the mobile robot to move from the corresponding current position to the corresponding destination position based on the navigation route.

In addition, the navigation system further includes a communication unit. The communication unit is configured to send the navigation route to a terminal device, so as to display the navigation route, the current position information, the destination position information or any arbitrary combination thereof on the map displayed by the terminal device.

Herein, the operating manners of each module in the navigation system of the present application are the same as or similar to corresponding steps in the above navigation method, and will not be described herein.

The present application further provides a mobile robot. The mobile robot includes but is not limited to a cleaning robot, a patrol robot and a robot for accompanying family members. The mobile robot performs the above navigation method. Please refer to FIG. 6 which shows a structural schematic diagram of the mobile robot of the present application in one embodiment. As shown in the figure, the mobile robot includes an image acquisition device 11, a movement device 12, a storage device 13 and a processing device 14. The image acquisition device 11, the movement device 12 and the storage device 13 are all connected with the processing device 14.

The image acquisition device 11 is configured to capture images during movement of the mobile robot. In some embodiments, the mobile robot includes one image acquisition device, and the mobile robot performs localization and movement control operations based on images captured by the image acquisition device. In other embodiments, the mobile robot includes more than one image acquisition device, and the mobile robot performs localization and movement control operations based on images captured by two image acquisition devices. The image acquisition device includes but is not limited to a camera, a video camera, an image acquisition module integrated with an optical system or a CCD chip, and an image acquisition module integrated with an optical system and a CMOS chip. A power supply system of the image acquisition device can be controlled by a power supply system of the mobile robot, and the image acquisition device captures images on the route along which the mobile robot moves.

It should be noted that, the assembly position of the image acquisition device is related to the range of a field angle (also named as angle of view) of the image acquisition device, the height between the image acquisition device and the ground, and the angle between the optic axis of the image acquisition device and the horizontal or vertical plane, therefore, the position of the image acquisition device in the mobile robot is not limited herein. For example, the image acquisition device assembled in the mobile robot is provided with an adjustment component used for adjusting the angle, and during movement of the mobile robot, the image acquisition device captures images containing the ground through adjusting the adjustment component. Wherein the adjustment component can include for example a deflection mechanism and a telescoping mechanism. And the deflection mechanism is used to drive the image acquisition device to perform a deflection motion. Specifically, the deflection mechanism can adjust the range of the field angle (also named as angle of view) of the image acquisition device, and the angle between the optic axis of the image acquisition device and the horizontal or vertical plane by performing a deflection motion. The telescoping mechanism is used to drive the support of the image acquisition device to perform telescopic motion. Specifically, the telescoping mechanism can adjust the height between the image acquisition device and the ground by performing a telescopic motion. For example, the image acquisition device is assemble at the edge of the top surface of the cleaning robot and the angle of view is 60°, and the angle between the optic axis of the image acquisition device and the horizontal plane is 15°.

It should be noted that, the angle between the optic axis of the image acquisition device and the horizontal plane can be other values, as long as the image acquisition device can capture the ground image region when capturing images. In addition, those skilled in the art should understand that, the angle between the optic axis and the vertical line or the horizontal line is only an example but not to limit the accuracy of the angle thereof within the range of 1°. The accuracy of the angle can be higher according to the actual design requirements of the robot, for example, more than 0.1°, 0.01° or the like. Endless examples will not be recited herein.

The movement device 12 is configured to controllably drive the mobile robot to move. Wherein the movement device 12 adjusts the movement distance, the movement direction, movement speed, movement acceleration and so on under the control of the processing device 14.

In some embodiments, the movement device 12 includes a drive unit and at least two sets of rolling wheels. Wherein at least one set of rolling wheels in at least two sets of rolling wheels is a controlled set of rolling wheels. The drive unit is connected with the processing device, and the drive unit is configured to drive the controlled set of rolling wheels to roll based on the movement control instruction output by the processing device.

The drive unit includes a drive motor, and the drive motor is connected with the sets of rolling wheels to directly drive the sets of rolling wheels to roll. The drive unit can include one or more central processing units (CPU) or micro processing units (MCU) dedicated to the control of the drive motor. For example, the micro processing unit is configured to convert the information or data provided by the processing device into electric signals which control the drive motor, and control the rotating speed and steering of the mobile robot according to the electric signals, so as to adjust the movement speed and movement direction of the mobile robot. The information or data can be a deflection angle determined by the processing device. The processor in the drive unit can be shared with the processor in the processing device or can be arranged independently. For example, the drive unit is used as a slave processing device, the processing device is used as a primary device, and the drive unit performs movement control based on the control of the processing device. Or the drive unit is shared with the processor in the processing device. The drive unit receives data provided by the processing device through a program interface. The drive unit is configured to control the set of controlled rolling wheels to roll based on the movement control instructions provided by the processing device.

The storage device 13 is configured to store the images captured by the image acquisition device 12, preset object type labels and programs. Wherein the images are captured by the image acquisition device and stored in the storage device 13.

In addition, the storage device is configured to store preset physical reference information, so as the relative position between the border line and the mobile robot can be determined based on preset physical reference information and based on the border line between the obstacles and the ground in the identified image. Wherein the physical reference information includes but is not limited to a physical height between the image acquisition device and the ground, physical parameters of the image acquisition device, and the angle between the optic axis of the image acquisition device and the horizontal or vertical plane. Herein, those skilled in the art measure the distance between an imaging center of the image acquisition device and the ground in advance, and consider the distance as the physical height or as an initial value of the physical height and store it in the storage device 13. The physical height can also be obtained through a calculation of the design parameters of the mobile robot in advance. The angle or an initial value of the angle between the optic axis of the image acquisition device and the horizontal or vertical plane can be obtained according to the design parameters of the mobile robot. For a mobile robot with an adjustable image acquisition device, the stored angle can be determined by adding/subtracting an adjusted deflection angle on the initial value of the angle, and the stored physical height is determined by adding/subtracting an adjusted height on the initial value of the physical height. The physical parameters of the image acquisition device include an angle of view of lens, a focal length of lens, and so on.

Wherein the object type label is screened in advance based on the environment in which the mobile robot moves and is stored in the storage device 13. The object type label is used to describe the classification of objects which are possibly captured and placed in the environment or the image features of the objects in images.

In some examples, the object type label can be characterized by image feature of an object, and the image feature can identify target object in the image. For example, when a mobile robot is used in an indoor environment, the object type label include but is not limited to table, chair, sofa, flowerpot, shoes, sock, tiled object, cup and other image features. Wherein the tiled object include but is not limited to ground mat or floor tile map paved on the floor, and tapestry or picture hanged on the wall.

In still other examples, the object type label can be characterized by object classification. Herein, the programs stored in the storage device include network structure and connection weights of a neural network model. In some embodiments, the neural network model can be a convolutional neural network, and the network structure includes an input layer, at least one hidden layer and at least one output layer. Wherein, the input layer is used to receive the captured images or the preprocessed images; the hidden layer includes a convolutional layer and an activation function layer, and even can further include at least one of a normalization layer, a pooling layer and a fusion layer; and the output layer is used to output images marked with object type labels. The connection weights is determined according to the connection relationship of each layer in the neural network model, for example, a connection relationship between the front layer and the rear layer set based on data transmission, a connection relationship with the front layer data set based on the size of a convolution kernel in each hidden layer, and a full connection. The neural network model identifies, from the image, the classification of each object and the position of each object in the image. Still with the indoor environment as an example, the object type label include but is not limited to table, chair, sofa, flowerpot, shoes, sock, tiled object, cup and unknown objects. Wherein the tiled object include but is not limited to ground mat or floor tile map paved on the floor, and tapestry or picture hanged on the wall. In addition, the unknown object indicates that one type of object which cannot be identified by the trained neural network and can be determined to be object, the unknown objects generally include objects which exist randomly indoors, for example, debris, toys, etc.

The programs stored in the storage device 13 include related programs which are invoked by the processing device to perform the above navigation method and which will be described below.

The storage device 13 includes but is not limited to a high speed random access memory and a non-volatile memory, for example, one or more disk storage devices, flash storage devices or other non-volatile solid state storage devices. In some embodiments, the storage device can also include a storage away from one or more processors, for example, a network attached storage accessed via an RF circuit or an external port and a communication network (not shown). Wherein the communication network can be an Internet, one or more intranets, a local area network (LAN), a wireless local area network (WLAN), a storage area network (SAN) or an appropriate combination thereof. A storage controller can control the access of other assemblies of robot such as a central processing unit (CPU) and a peripheral interface to the storage device.

The processing device 14 is in data communication with the storage device 13, the image acquisition device 11 and the movement device 12. The processing device 14 can include one or more processors. The processing device 14 can be operably coupled to a volatile memory and/or a non-volatile memory in the storage device 13. The processing device can execute instructions stored in the storage and/or non-volatile memory to perform operations in the robot, for example, identifying object image region and ground image region based on the object type label, and determining the relative position between the target and the mobile robot. Thus, the processor can include one or more general-purpose microprocessors, one or more application specific integrated circuits (ASIC), one or more digital signal processors (DSP), one or more field programmable gate arrays (FPGA) or any combination thereof. The processing device is also operably coupled to an I/O port and an input structure, wherein the robot can interact with various other electronic apparatus by the I/O port, and the user can interact with a computing apparatus by the input structure. Therefore, the input structure can include a button, a keyboard, a mouse, a touchpad and the like. The other electronic apparatus can be a mobile motor in the movement device of the robot, or a slave processor dedicated to the control of the movement device in the robot, for example, a microcontroller unit (MCU).

In an example, the processing device is connected with the storage device, the image acquisition device and the movement device respectively through data cables. The processing device interacts with the storage device through a data read-write technology, and the processing device interacts with the image acquisition device and the movement device through an interface protocol. Wherein the data read-write technology includes but is not limited to a high-speed/low-speed data interface protocol, a database read-write operation and the like. The interface protocol includes but is not limited to an HDMI interface protocol, a serial interface protocol and the like.

The processing device 14 firstly identifies a target object corresponding to the preset object type label from images captured by the image acquisition device 11, and then determines the relative position between the target and the mobile robot based on at least one image which contains the identified target and is captured by the image acquisition device 11. Next, the processing device generates a map marked with the object type label through marking corresponding object type label on a preset map based on the relative position. Specific implementations in which the processing device performs the above steps to obtain a map marked with object type labels are as shown in FIG. 1 to FIG. 5 and related descriptions, and will not be described herein.

In addition, after the map marked with object type labels is generated, the mobile robot can move based on the map. In view of this, the mobile robot further includes an input device which is configured to acquire instructions containing object type labels. Wherein the manner of acquiring instructions containing object type labels includes but is not limited to a voice manner and a text manner.

In one embodiment, the input device includes a voice input unit which is configured to acquire voice information. The processing device can identify instruction which contain the object type label from the voice information. In one example, the voice input unit of the mobile robot can directly receive voice information of users. Then the processing device identifies the instruction containing object type label contained in the voice information. For example, users can directly say "flowerpot" to the mobile robot, and after the voice input unit of the mobile robot receives the voice information, the processing device identifies the "flowerpot" instruction, and controls the mobile robot to move to the flowerpot to perform corresponding processing which is set in advance. With a patrol robot as an example, the patrol robot can be set in advance that the patrol robot can move to the position corresponding to object type label after receiving the instruction containing object type label and capture images and display the images to users remotely, when users say "flowerpot" to a patrol robot, the voice input unit of the patrol robot sends the voice information to the processing device after receiving the voice information, and the processing device controls the mobile robot to move to the flowerpot and performs image capturing and displaying operations. With a cleaning robot as an example, the cleaning robot can be set in advance that the cleaning robot can move to the position corresponding to the object type label after receiving the instruction containing object type label and perform cleaning operation, when users say "flowerpot" to the cleaning robot, the voice input unit of the cleaning robot sends the voice information to the processing device after receiving the voice information, and the processing device controls the mobile robot to move to the flowerpot and performs cleaning operations. In addition, the voice information is not limited to short instruction which only represent object type label, and can also be long instruction containing object type label, for example, when users say "go to the flowerpot", the voice input unit of the mobile robot receives the voice information of "go to the flowerpot" and sends the voice information to the processing device, and the processing device identifies the instruction of object type label "flowerpot" contained in the voice information, and then performs the following operations.

In another embodiment, the input device includes a network interface unit which is configured to acquire instruction containing object type label from the terminal device which is connected in a wireless manner For example, users input instruction containing object type label via a terminal device which is in wireless connection with the mobile robot, and the mobile robot acquires the input instruction via the network interface unit and sends the instruction to the processing device for subsequent operations. In one example, uses input instruction containing object type label in the form of a text via the terminal device. For example, users input "flowerpot" in the form of a text via an APP on the mobile phone. In another example, uses input instruction containing object type label in the form of voice via the terminal device. For example, users input "flowerpot" in the form of voice via an APP on the mobile phone. In addition, the voice information input by users is not limited to short instruction which only represent object type label, and can also be long instruction containing object type label. For example, when users say "go to the flowerpot", then the mobile robot can identify the instruction of object type label "flowerpot" contained in the voice information and then perform subsequent operations. In addition, the terminal device can be connected with the mobile robot in a bluetooth pairing manner, so as to send the instructions received by the terminal device to the mobile robot via a network interface unit for subsequent operations.

After the mobile robot acquires instruction containing object type label, the processing device is further configured to determine the destination position information of the object type label containing in the instruction in the map and the current position information of the mobile robot in the map based on the generated map marked with object type labels, and control the movement device to move to the corresponding destination position from the corresponding current position based on the map.

In some embodiments, the mobile robot acquires the destination position information of object type label in the map based on corresponding object type label marked on the map. The current position information of the mobile robot in the map can be acquired based on the motion sensor of the mobile robot, such as an odometer sensor. And then, the mobile robot controls the mobile robot to move from the corresponding current position to the corresponding destination position according to the destination position indicated by the object type label on the map marked with object type labels, the current position of the mobile robot on the map acquired by the motion sensor, and other information such as position information of other objects or preset routes on the map. For example, the mobile robot can be controlled to move from the current position to the destination position and avoid other objects which serve as obstacles and are displayed on the map.

In addition, the network interface unit in mobile robot can send the movement route from the corresponding current position to the corresponding destination position to the terminal device, so as to display the movement route, the current position information, destination position information, or combination thereof on the map displayed by the terminal device so as to allow users to view. For example, in some conditions, the current position of the robot can be displayed in real time on the map displayed by the terminal device, and when the destination position is the position where the flowerpot is located, the flowerpot is displayed at the destination position on the map, and the movement route from the current position of the mobile robot to the flowerpot is displayed on the map.

As to the mobile robot of the present application, through the technical solution that acquiring instruction containing object type label, and controlling the movement of the mobile robot based on the determined current position of the mobile robot and position of object type label contained in the instruction on a map marked with object type label, users can identify the destination position contained in user instruction based on object type label on the map without acquiring destination position information, then the mobile robot can move to the destination position, therefore, the operation process is simple and human-computer interactivity is improved.

Figure 6:
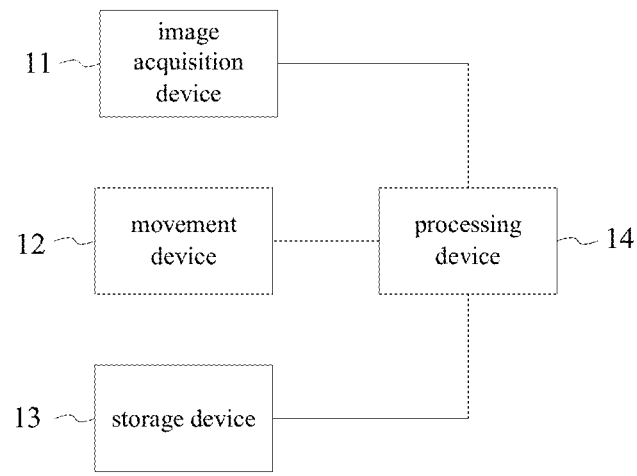
FIG. 6 shows a structural schematic diagram of a mobile robot of the present application in one embodiment.
Figure 7:
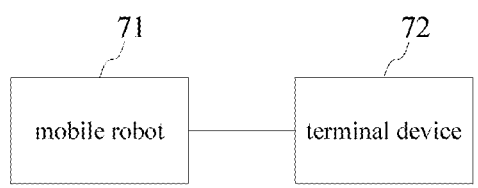
FIG. 7 shows a structural schematic diagram of a movement control system of the present application in one embodiment.

The present application further provides a movement control system. Please refer to FIG. 7 which shows a structural schematic diagram of a movement control system of the present application in one embodiment. As shown in the figure, the movement control system includes a mobile robot 71 and a terminal device 72. The mobile robot 71 is in wireless communication with the terminal device 72 via a shared wifi or via bluetooth pairing.

Wherein the mobile robot 71 includes an image acquisition device, a movement device, a storage device and a processing device, wherein the processing device generates a map marked with object type labels based on images captured by an image acquisition device and preset object type labels. In addition, the mobile robot 71 further includes an input device, wherein the input device acquires instruction containing object type label, such that the mobile robot can move from the current position to the destination position corresponding to the object type label contained in the instruction based on the instruction. Specific implementations of the mobile robot are as shown in FIG. 6 and related descriptions, and will not be described herein.

The terminal device can be the device which can receive input instructions and which can be in communication with the mobile robot to control the movement of the mobile robot, such as mobile phone or panel. The terminal device 72 includes an input unit and a communication unit. Wherein the input unit is configured to receive instruction containing object type label. In one embodiment, the input unit is configured to receive text instruction containing object type label. For example, users can input text instructions to the input unit via a keyboard or a touch screen. In another embodiment, the input unit is configured to receive voice information and identify the instruction containing object type label in the voice information. For example, users can say a sentence containing an object type label, such as "move to a flowerpot", the input unit receives the voice and identifies instruction of the object type label "flowerpot" contained in the voice information. And then, the communication unit transmits the received instructions to the mobile robot, such that the mobile robot moves from the current position to the destination position corresponding to the object type label based on the instruction.

In addition, the terminal device can further include a display unit which is configured to display the acquired map. In some embodiments, based on the requirements of users, the display unit of the terminal device is further configured to display, on the acquired map marked with object type labels, the current position of the mobile robot, the destination position corresponding to the object type label, the movement route along which the mobile robot moves from the current position to the destination position corresponding to the object type label, or any arbitrary combination thereof.

Figure 8:
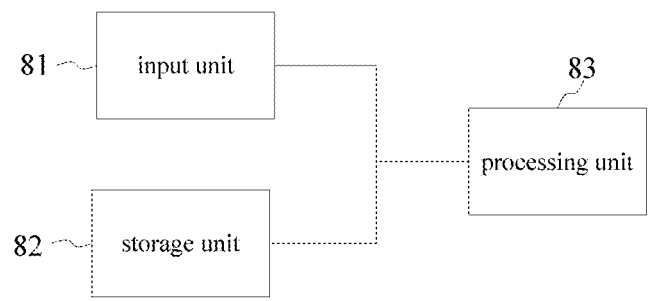
FIG. 8 shows a structural schematic diagram of a processing system of the present application in one embodiment.

The present application further provides a processing system for a mobile robot with an image acquisition device. The processing system can be for example a control mainboard which is assembled on a mobile robot with an image acquisition device to control the movement of the mobile robot. Please refer to FIG. 8 which shows a structural schematic diagram of a processing system of the present application in one embodiment. As shown in the figure, the processing system includes an input unit 81, a storage unit 82 and a processing unit 83.

The input unit 81 is configured to receive images captured by the image acquisition device. In some embodiments, the input unit 81 is connected with the image acquisition device of the mobile robot, so as to input the captured images to the processing system. Herein, the input unit 81 can include hardware and software which are in data connection with the image acquisition device, wherein the hardware includes but is not limited to an USB interface, an HDMI interface, etc., and the software includes but is not limited to read images in the image acquisition device based on the corresponding interface protocol.

The storage unit 82 is configured to store the captured images, preset physical reference information, object type labels and at least one program.

Wherein the storage unit 82 can include a high speed random access memory, and can also include a non-volatile memory, for example, one or more disk storage devices, flash memory devices or other non-volatile solid state storage devices. The storage unit 82 further includes a storage controller which can control the access of other assemblies of the device such as a CPU or a peripheral interface to the storage.

Wherein the physical reference information includes but is not limited to a physical height between the image acquisition device and the ground, physical parameters of the image acquisition device, and the angle between the optic axis of the image acquisition device and the horizontal or vertical plane. Herein, those skilled in the art measure the distance between an imaging center of the image acquisition device and the ground in advance, and consider the distance as the physical height or as an initial value of the physical height and store it in the storage unit 82. The physical height can also be obtained through a calculation of the design parameters of the mobile robot in advance. The angle or an initial value of the angle between the optic axis of the image acquisition device and the horizontal or vertical plane can be obtained according to the design parameters of the mobile robot. For a mobile robot with an adjustable image acquisition device, the stored angle can be determined by adding/subtracting an adjusted deflection angle on the initial value of the angle, and the stored physical height is determined by adding/subtracting an adjusted height on the initial value of the physical height. The physical parameters of the image acquisition device include an angle of view of lens, a focal length of lens, and so on.

Wherein the object type label is screened in advance based on the environment in which the mobile robot moves and is stored in the storage unit 82. The object type label is used to describe the classification of objects which are possibly captured and placed in the environment or the image features of the objects in images.

In some examples, the object type label can be characterized by an image feature of the object, and the image feature can identify the target object in the image. For example, when a mobile robot is used in an indoor environment, the object type label include but is not limited to table, chair, sofa, flowerpot, shoes, sock, tiled object, and other image features. Wherein the tiled object include but is not limited to ground mat or floor tile map paved on the floor, and tapestry or picture hanged on the wall.

In still other examples, the object type label can be characterized by object classification. Herein, the programs stored in the storage unit include network structure and connection weights of a neural network model. In some embodiments, the neural network model can be a convolutional neural network, and the network structure includes an input layer, at least one hidden layer and at least one output layer. Wherein, the input layer is used to receive the captured images or the preprocessed images; the hidden layer includes a convolutional layer and an activation function layer, and even can further include at least one of a normalization layer, a pooling layer and a fusion layer; and the output layer is used to output images marked with object type labels. The connection weights is determined according to the connection relationship of each layer in the neural network model, for example, a connection relationship between the front layer and the rear layer set based on data transmission, a connection relationship with the front layer data set based on the size of a convolution kernel in each hidden layer, and a full connection. The neural network model identifies, from the image, the classification of each object and the position of each object in the image. Still with the indoor environment as an example, the object type label include but is not limited to table, chair, sofa, flowerpot, shoes, sock, tiled object and unknown objects. Wherein the tiled object include but is not limited to ground mat or floor tile map paved on the floor, and tapestry or picture hanged on the wall. In addition, the unknown object indicates that one type of object which cannot be identified by the trained neural network and can be determined to be object, the unknown objects generally include objects which exist randomly indoors, for example, debris, toys, etc.

The programs stored in the storage unit 82 include related programs which are invoked by the processing unit to perform the navigation method and which will be described below.

Wherein the processing unit 83 is operably coupled to the input unit, the storage unit and so on. In addition, the processor is also operably coupled to a power supply, and the power supply can provide electricity for various parts in a control mainboard. In view of this, the power supply can include any appropriate energy, for example, a rechargeable Li-polymer (Li-poly) battery and/or an alternating current (AC) power converter.

The processing unit 83 is configured to invoke at least one program and perform any of the navigation method mentioned above. Wherein the processing unit 83 is in data communication with the input unit 81 and the storage unit 82. The processing unit 83 can execute the instructions stored in the storage unit so as to perform operations in the robot. Specific implementations in which the processing unit performs the navigation method are as shown in FIG. 1 to FIG. 4 and related descriptions, and will not be described herein.

In some embodiments, the processing system further includes an output unit which is configured to output the current position of the mobile robot, the destination position corresponding to the object type label, the navigation route from the current position to the destination position corresponding to the object type label, and/or the movement route along which the mobile robot moves according to the navigation route so as to allow users to view.

Wherein the output unit can include hardware and software which are in data connection with the processing unit 83, wherein the hardware includes but is not limited to a USB interface, an HDMI interface and a network interface, and the software includes but is not limited to output map based on corresponding interface protocol, draw, on the map, the current position of the mobile robot, the destination position indicated by the object type label, a navigation route, a movement route along which the mobile robot moves according to the navigation route, and the navigation route and the movement route. The output unit outputs the map provided by the processing unit and the navigation route and/or movement route drawn on the map to a display screen or a terminal device for users to view.

In addition, it should also be noted that, through the description of the above implementations, those skilled in the art can clearly understand that part or all of the present application can be realized by means of software and in combination with necessary general-purpose hardware platforms. Based on this, the present application further provides a storage medium of an computer apparatus, the storage medium stores at least one program, and when the program are executed by processor, the navigation method described above can be performed.

Based on this understanding, the technical solutions of the present application essentially or the part contributing to the prior art can be embodied in the form of a software product, the computer software product can include one or more machine readable media which store machine executable instructions thereon, when these instructions are executed by one or more machines such as a computer, a computer network or other electronic apparatus, such one or more machines can execute operations based on the embodiments of the present application, for example, executing each step in the control method of the mobile robot, etc. The machine readable media include but are not limited to, a floppy disk, an optical disk, a CD-ROM (a compact disc-read only memory), a magnetic optical disc, an ROM (read-only memory), an RAM (random access memory), an EPROM (erasable programmable read-only memory), an EEPROM (electrically erasable programmable read-only memory), a magnetic card or optical card, a flash memory or other types of media/machine readable media which are applicable to storing machine executable instructions. Wherein the storage media can be located in the mobile robot and can also be located in a third-party server, for example, in a server providing a certain application store. Specific application stores are not limited herein, and can be a MIUI application store, a Huawei application store, and an Apple application store, etc.

The application can be used in numerous general-purpose or special-purpose calculating system environments or configurations, for example, personal computer, server computer, handheld device or portable device, tablet device, multiprocessor system, microprocessor based system, set top box, programmable consumer electronic device, network PC, small-size computer, large-scale computer, and a distributed computing environment containing any of the above system or device.

The present application can be described in the general context of the computer executable instructions executed by the computer, such as a program module. Generally, the program module includes routines, programs, objects, components, data structures and the like which execute particular tasks or realize particular abstract data types. The present application can also be practiced in the distributed computing environments. In these distributed computing environments, tasks are executed by remote processing devices which are connected via a communication network. In the distributed computing environments, the program module can be located in a local and remote computer storage medium including a storage device.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A processing system for a mobile robot with an image acquisition device, comprising:
   an input unit, configured to receive images captured by the image acquisition device;
   a storage unit, configured to store the captured images, preset object type labels and at least one program; and
   a processing unit, configured to invoke the at least one program and perform the following steps:
      identifying a target object corresponding to a preset object type label from images captured by the image acquisition device, wherein, the object type label is used for interacting with a user, and wherein the object type label is configured for display on a map based on an operation of viewing the map by the user;
      determining a relative position between the target object and the mobile robot based on at least one image which contains the identified target object and is captured by the image acquisition device; and
      generating a map marked with the object type label through marking the corresponding preset object type label on a preset map based on the relative position, wherein the map is used for navigating the mobile robot.

2. The processing system of claim 1, wherein, the step of identifying a target object corresponding to a preset object type label from images captured by the image acquisition device comprises: based on object type labels provided by a first neural network, identifying the target object corresponding to the preset object type label from the captured images.

3. The processing system of claim 1, wherein, the step of determining the relative position between the target object and the mobile robot based on at least one image which contains the identified target object and is captured by the image acquisition device comprises:
    determining the relative position between the target object and the mobile robot based on at least one image which contains the identified target object and is captured by the image acquisition device; or
    determining the relative position between the target object and the mobile robot based on at least two images which contain the identified target object and are captured synchronously by different image acquisition devices.

4. The processing system of claim 1, wherein, the processing unit is further configured to perform the following steps:
    identifying a border line between an obstacle and the ground in the captured image; and
    selecting an object placed on the ground from the target objects which are identified and correspond to the preset object type labels.

5. The processing system of claim 4, wherein, the step of determining the relative position between the object placed on the ground and the mobile robot based on at least one image which contains the identified target object and is captured from an image acquisition device comprises: determining the relative position between a physical position corresponding to the object placed on the ground and the mobile robot based on preset physical reference information.

6. The processing system of claim 1, wherein, the step of generating a map marked with the object type label through marking the corresponding object type label on a preset map based on the relative position comprises: marking the corresponding object type label on a grid corresponding to the relative position on the preset map.

7. The processing system of claim 1, wherein, the processing unit is further configured to perform the following steps:
    acquiring an instruction containing an object type label;
    determining destination position information of the object type label contained in the instruction in the map and the current position information of the mobile robot in the map based on the generated map; and
    generating a navigation route from the current position information to the destination position information based on the map.

8. The processing system of claim 7, wherein, the processing unit is further configured to perform a step of sending the navigation route to a terminal device, so as to display the navigation route, the current position information and/or destination position information on the map displayed by the terminal device.

9. The processing system of claim 7, wherein, the step of acquiring an instruction containing object type label comprises any of:
    acquiring voice information, and identifying the instruction containing an object type label from the voice information; or
    acquiring the instruction containing an object type label from a terminal device, wherein the terminal device is connected with the mobile robot wirelessly.

10. The processing system of claim 1, wherein, the processing system further comprises an output unit, configured to output a current position of the mobile robot, a destination position corresponding to the object type label, a navigation route from the current position of the mobile robot to the destination position corresponding to the object type label, and/or a movement route along which the mobile robot moves according to the navigation route so as to allow users to view.

11. A mobile robot, comprising:
    an image acquisition device, configured to capture images during movement of the mobile robot;
    a movement device, configured to controllably drive the mobile robot to move;
    the processing system of claim 1, connected with the image acquisition device and the movement device.

12. The mobile robot of claim 11, wherein, the mobile robot further comprises an input device which is configured to acquire an instruction containing object type label;
    the processing device is further configured to perform the following steps:
        determining destination position information of the object type label contained in the instruction in the map and the current position information of the mobile robot in the map based on the map generated by the processing system; and
        controlling the movement device to move from the corresponding current position to the corresponding destination position based on the map.

13. The mobile robot of claim 12, wherein, the input device comprises a voice input unit, the voice input unit is configured to acquire voice information; and
    the processing device is configured to identify the instruction containing object type label from the voice information.

14. The mobile robot of claim 12, wherein, the input device comprises a network interface unit, the network interface unit is configured to acquire the instruction containing an object type label from a terminal device which is connected with the mobile robot wirelessly, and/or send the movement route from the corresponding current position to the corresponding destination position to the terminal device, so as to display the movement route, the current position information and/or destination position information on the map displayed by the terminal device.

15. The mobile robot of claim 11, wherein, the mobile robot is a cleaning robot.

16. A movement control system, comprising:
    the mobile robot of claim 11; and
    a terminal device, configured to communicate with the mobile robot wirelessly and acquire the map marked with object type labels of the mobile robot.

17. The movement control system of claim 16, wherein, the terminal device comprises:
    an input unit, configured to receive the instruction containing an object type label; and
    a communication unit, configured to transmit the received instruction to the mobile robot, such that the mobile robot moves from the current position to the destination position corresponding to the object type label based on the instruction.

18. The movement control system of claim 17, wherein, the input unit is configured to receive a text instruction containing an object type label; or the input unit is configured to receive voice information and identify the instruction containing an object type label in the voice information.

19. The movement control system of claim 17, wherein, the terminal device further comprises a display unit, the display unit is configured to display the acquired map, and/or the display unit is configured to display at least one item selected from the following on the acquired map: the current position of the mobile robot, the destination position corresponding to the object type label, the movement route along which the mobile robot moves from the current position to the destination position corresponding to the object type label.

* * * * *